United States Patent
Chen

(10) Patent No.: US 10,494,703 B2
(45) Date of Patent: Dec. 3, 2019

(54) COMPOSITES

(71) Applicant: National Tsing Hua University, Hsinchu (TW)

(72) Inventor: Swe-Kai Chen, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 175 days.

(21) Appl. No.: 15/429,360

(22) Filed: Feb. 10, 2017

(65) Prior Publication Data

US 2018/0179617 A1    Jun. 28, 2018

(30) Foreign Application Priority Data

Dec. 22, 2016   (TW) ................. 105142822

(51) Int. Cl.
C04B 35/56 (2006.01)
C04B 35/58 (2006.01)
C22C 29/02 (2006.01)
C22C 29/14 (2006.01)

(52) U.S. Cl.
CPC .......... *C22C 29/14* (2013.01); *C04B 35/5607* (2013.01); *C04B 35/5611* (2013.01); *C04B 35/58071* (2013.01); *C04B 35/58078* (2013.01); *C22C 29/02* (2013.01); *C04B 2235/3813* (2013.01); *C04B 2235/3839* (2013.01); *C04B 2235/3843* (2013.01); *C04B 2235/3847* (2013.01); *C04B 2235/404* (2013.01); *C04B 2235/96* (2013.01)

(58) Field of Classification Search
None
See application file for complete search history.

(56) References Cited

U.S. PATENT DOCUMENTS

| 4,917,964 | A | * | 4/1990 | Moshier | ............... | B22F 3/1143 |
| | | | | | | 148/405 |
| 5,093,148 | A | * | 3/1992 | Christodoulou | .......... | B22F 3/23 |
| | | | | | | 219/118 |

* cited by examiner

*Primary Examiner* — Colin W. Slifka
(74) *Attorney, Agent, or Firm* — Locke Lord LLP; Tim Tingkang Xia, Esq.

(57) ABSTRACT

Composites having the composition of at least one principal strengthening phase compound and one cemented phase of principal refractory metal are disclosed. The components of the strengthening phase compound can be a boride or a mixture of a boride and one or more than one carbide. In addition, the composites are obtained by smelting the principal strengthening phase compound and the cemented phase principal refractory metal in a non-equal molar ratio.

1 Claim, 6 Drawing Sheets

| Serial Number | Compenent |
|---|---|
| NTTBMo | $(NbC)_{0.15}(TaC)_{0.15}(TiB_2)_{0.3}Mo_{0.4}$ |
| NTTBW | $(NbC)_{0.15}(TaC)_{0.15}(TiB_2)_{0.3}W_{0.4}$ |
| NTZBMo | $(NbC)_{0.15}(TaC)_{0.15}(ZrB_2)_{0.3}Mo_{0.4}$ |
| NTZBW | $(NbC)_{0.15}(TaC)_{0.15}(ZrB_2)_{0.3}W_{0.4}$ |

| Serial Number | Compenent |
|---|---|
| ZB3W7 | $(ZrB_2)_{0.3}W_{0.7}$ |
| ZB4W6 | $(ZrB_2)_{0.4}W_{0.6}$ |
| ZB6W4 | $(ZrB_2)_{0.6}W_{0.4}$ |
| ZB7W3 | $(ZrB_2)_{0.7}W_{0.3}$ |
| TBNb | $(TiB_2)_{0.6}Nb_{0.4}$ |
| TBTa | $(TiB_2)_{0.6}Ta_{0.4}$ |
| TBMo | $(TiB_2)_{0.6}Mo_{0.4}$ |
| TBW | $(TiB_2)_{0.6}W_{0.4}$ |
| ZBNb | $(ZrB_2)_{0.6}Nb_{0.4}$ |
| ZBTa | $(ZrB_2)_{0.6}Ta_{0.4}$ |
| ZBMo | $(ZrB_2)_{0.6}Mo_{0.4}$ |
| ZBW | $(ZrB_2)_{0.6}W_{0.4}$ |

*FIG.2A*

| Serial Number | Hardenss(HV) | Fracture Toughness ($K_{IC}$, MPa m$^{1/2}$) |
|---|---|---|
| ZB3W7 | 845 ± 44 | 12.9 ± 0.3 |
| ZB4W6 | 1007 ± 19 | 12.7 ± 0.4 |
| ZB6W4 | 1263 ± 29 | 11.3 ± 0.4 |
| ZB7W3 | 1352 ± 38 | 10.7 ± 0.4 |
| TBNb | 1608 ± 35 | 4.9 ± 0.3 |
| TBTa | 1936 ± 73 | Indentations crack seriously |
| TBMo | 1647 ± 29 | 7.7 ± 0.4 |
| TBW | 1726 ± 51 | 6.4 ± 0.5 |
| ZBNb | 1514 ± 38 | 7.2 ± 0.5 |
| ZBTa | 1543 ± 43 | 7.2 ± 0.2 |
| ZBMo | 1434 ± 30 | 7.0 ± 0.4 |
| ZBW | 1197 ± 44 | 11.0 ± 0.5 |

*FIG.2B*

| Serial Number | Compenent |
|---|---|
| N1T5 | $[(NbC)_{0.1}(TaC)_{0.5}]W_{0.4}$ |
| N2T4 | $[(NbC)_{0.2}(TaC)_{0.4}]W_{0.4}$ |
| N4T2 | $[(NbC)_{0.4}(TaC)_{0.2}]W_{0.4}$ |
| N5T1 | $[(NbC)_{0.5}(TaC)_{0.1}]W_{0.4}$ |

*FIG.3A*

| Serial Number | Hardenss(HV) | Fracture Toughness ($K_{IC}$, MPa m$^{1/2}$) |
|---|---|---|
| N1T5 | 1920 ± 33 | 7.3 ± 0.4 |
| N2T4 | 1901 ± 39 | 7.6 ± 0.3 |
| N4T2 | 1878 ± 57 | 8.1 ± 0.5 |
| N5T1 | 1925 ± 26 | 7.6 ± 0.3 |

*FIG.3B*

| Serial Number | Compenent |
|---|---|
| NT3a | $[(TiC)_2(NbC)(TaC)(WC)]_{0.6}W_{0.4}$ |
| N3a | $[(TiC)_2(NbC)_2(WC)]_{0.6}W_{0.4}$ |
| T3a | $[(TiC)_2(TaC)_2(WC)]_{0.6}W_{0.4}$ |
| NT3aV | $[(TiC)_2(VC)(NbC)(TaC)]_{0.6}W_{0.4}$ |
| NT3aVW | $[(TiC)_2(VC)_{0.5}(NbC)(TaC)(WC)_{0.5}]_{0.6}W_{0.4}$ |

*FIG.4A*

| Serial Number | Hardenss(HV) | Fracture Toughness $(K_{IC}, MPa\, m^{1/2})$ |
|---|---|---|
| NT3a | 2128 ± 66 | 8.1 ± 0.4 |
| N3a | 1783 ± 23 | 8.5 ± 0.5 |
| T3a | 2082 ± 17 | 8.2 ± 0.3 |
| NT3aV | 2086 ± 43 | 7.7 ± 0.4 |
| NT3aVW | 2091 ± 41 | 8.2 ± 0.4 |

*FIG.4B*

| Serial Number | Compenent |
|---|---|
| NTTBMo | $(NbC)_{0.15}(TaC)_{0.15}(TiB_2)_{0.3}Mo_{0.4}$ |
| NTTBW | $(NbC)_{0.15}(TaC)_{0.15}(TiB_2)_{0.3}W_{0.4}$ |
| NTZBMo | $(NbC)_{0.15}(TaC)_{0.15}(ZrB_2)_{0.3}Mo_{0.4}$ |
| NTZBW | $(NbC)_{0.15}(TaC)_{0.15}(ZrB_2)_{0.3}W_{0.4}$ |

*FIG.5A*

| Serial Number | Hardenss(HV) | Fracture Toughness ($K_{IC}$,MPa m$^{1/2}$) |
|---|---|---|
| NTTBMo | 1823 ± 39 | 6.1 ± 0.2 |
| NTTBW | 2028 ± 42 | 6.7 ± 0.2 |
| NTZBMo | 1863 ± 30 | 6.9 ± 0.1 |
| NTZBW | 1995 ± 48 | 6.9 ± 0.3 |

*FIG.5B*

COMPOSITES

CROSS REFERENCE TO RELATED APPLICATION

This application also claims priority to Taiwan Patent Application No. 105142822 filed in the Taiwan Patent Office on Dec. 22, 2016, the entire content of which is incorporated herein by reference.

BACKGROUND OF THE INVENTION

1. Field of the Invention

The disclosure is related to composites, and, more particularly to composites with high hardness and high toughness prepared by smelting at least one principal strengthening phase compound and one cemented phase of principal refractory metal in non-equal molar ratio.

2. Descriptions of the Related Art

Cemented carbides are composite composed of WC and Co. In the early 1900s, Henri Moissan and et al. synthesized tungsten carbide (WC). Tungsten carbide is associated with high hardness and was meant for replacing diamond. However, tungsten carbide is brittle and porous, such that is it not suitable in engineering. In 1923, Schröter and Baumhauer found out that after being sintered with cobalt or nickel, tungsten carbide can maintain the hardness of ceramics and has the toughness of metals. Thus, it is beneficial in mould industry. The material can be widely used in different units of cutting tools, mineral extractions and military weapons. About 60% of W material is used in producing cemented carbides. In 1930, the demand was just 10 tons, but in 2008 the demand had increased 5000 times to 50,000 tons.

Cemented carbides are composed of two parts, one is a strengthening phase, and the other is a cemented phase. As described above, WC may serve as the strengthening phase, and it has a high melting point, a high toughness as well as being good in wear resistance. Co may serve as the cemented phase, and it has a high electrical and thermal conductivity as well as a high toughness, which is the most important property, such that the composite is not brittle. In recent studies, hard metals, such as WC and Co, are used as the basis, and TiC, TaC and so forth are also developed. Also, Mo, Ni, Fe and so forth are developed for the cemented phase. These materials are named as cermet composites as traditional hard metals include such cermet composites, which are typically prepared by sintering with incorporation of the minute amount of the cemented phase.

However, there are a variety of choices for the composite prepared from the above described components, and the composite having a high hardness and a high toughness cannot be prepared by all of the strengthening phases and the cemented phases. Therefore, if certain strengthening phase materials and certain cemented phase materials could be identified composite with a high hardness and a high toughness can be prepared by these materials.

SUMMARY OF THE INVENTION

The disclosure is related to composite, the composition of the composite is one principal strengthening phase compound and one cemented phase of principal refractory metal, and the principal strengthening phase compound can be borides. Plus, the mole fractions of the principal strengthening phase compound and the mole fraction of the cemented phase of principal refractory metal are different.

More specifically, the cemented phase of principal refractory metal is selected from niobium, tantalum, molybdenum and tungsten.

More specifically, the boride is selected from $TiB_2$ and $ZrB_2$.

Composition of the disclosed composite is with at least two principal strengthening phase compounds and one cemented phase of principal refractory metal, where the components of the strengthening phase compound can be a mixture of a boride and one or more than one carbide. Additionally, the composite is obtained by smelting any two compounds in the strengthening phase compound with the cemented phase of principal refractory metal.

More specifically, the cemented phase of principal refractory metal is selected from niobium, tantalum, molybdenum and tungsten.

More specifically, the boride is selected from $TiB_2$ and $ZrB_2$.

More specifically, the carbide is selected from TiC, VC, ZrC, HfC, WC, NbC and TaC.

BRIEF DESCRIPTION OF THE DRAWINGS

FIG. 2A is a schematic diagram of the serial number and the composition of the composite according to one embodiment of the disclosure;

FIG. 2B is a schematic diagram of the mechanical properties of the composite according to one embodiment of the disclosure;

FIG. 3A is a schematic diagram of the serial number and the composition of the composite according to one embodiment of the disclosure;

FIG. 3B is a schematic diagram of the mechanical properties of the composite according to one embodiment of the disclosure;

FIG. 4A is a schematic diagram of the serial number and the composition of the composite according to one embodiment of the disclosure;

FIG. 4B is a schematic diagram of the mechanical properties of the composite according to one embodiment of the disclosure;

FIG. 5A is a schematic diagram of the serial number and the composition of the composite according to one embodiment of the disclosure; and FIG. 5B is a schematic diagram of the mechanical properties of the composite according to one embodiment of the disclosure.

DETAILED DESCRIPTION OF THE PREFERRED EMBODIMENTS

Figure 1:
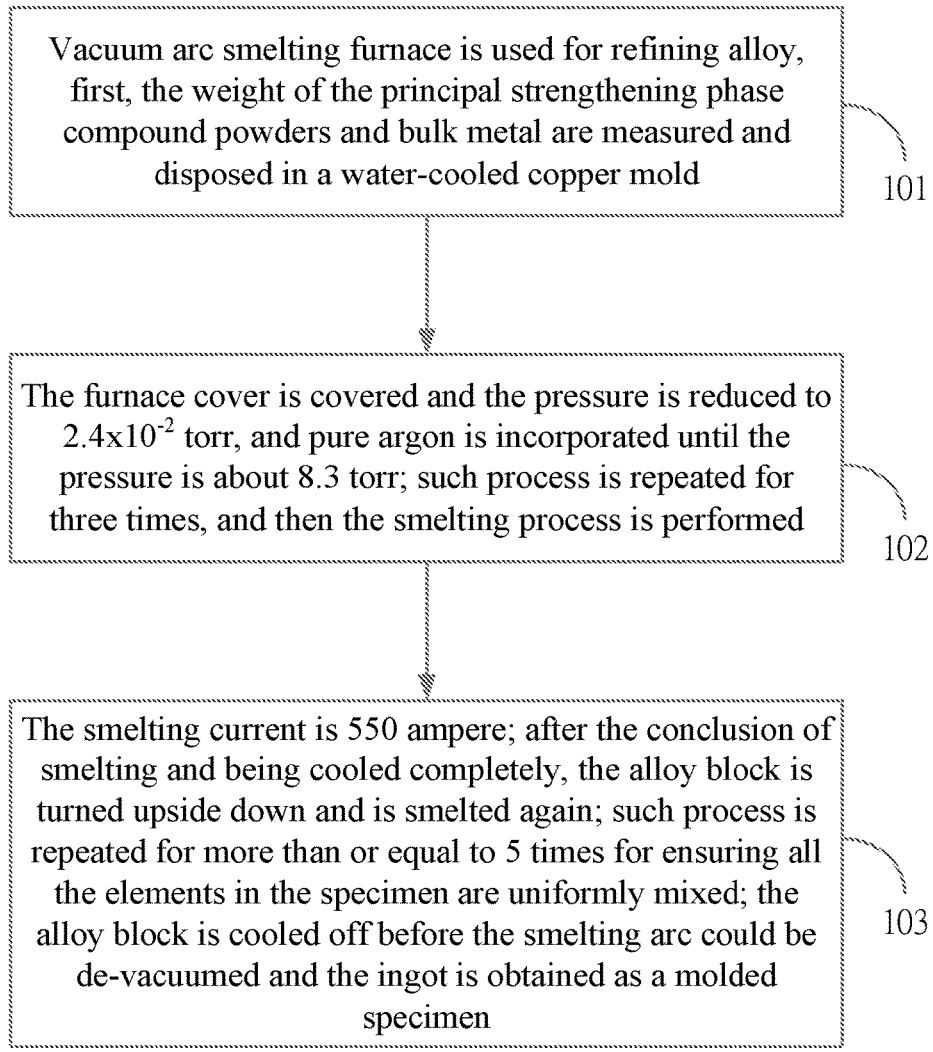
FIG. 1 is a flow chart of the process for preparing the composite of the disclosure according to one embodiment of the disclosure.

The technical solutions, features and effects of the disclosure can be clearly described in the description of embodiments with reference to the drawings.

According to the disclosure, the feature is to select appropriate principal strengthening phase compound (one boride or a mixture of one boride and one or more than one carbides) and unitary cemented phase of principal refractory metal so as to prepare a composite having a high hardness and a high toughness. According to the disclosure, a composite having a high hardness and a high toughness can be obtained by sintering or smelting through collocation of the combinations of the principal strengthening phase compound and the cemented phase of principal refractory metal.

Although the product prepared by sintering maintains a higher hardness and a higher strength under a low temperature, the process is too complicated, and the toughness of the prepared product remains a lot to be desired. Thus, although it is feasible to prepare the principal strengthening phase compound and cemented phase of principal refractory metals by sintering, smelting may be another feasible alternative to sintering while being more simplified and less time consuming. In addition, the metallurgical microstructure of the product prepared by smelting is a typical branched phase structure, which has zero porosity and has a good toughness. Therefore, the disclosure is explained by the embodiments of smelting. However, a composite with a high hardness and a high toughness can still be prepared by sintering when using the composition of the disclosure.

As shown in FIG. 1, when using smelting, the method is as the following:

(1) Vacuum arc smelting furnace is used for refining alloy, first, the weight of the principal strengthening phase compound powders and bulk metal are measured and disposed in a water-cooled copper mold 101;

(2) The furnace cover is covered and the pressure is reduced to $2.4 \times 10^{-2}$ torr, pure argon is incorporated until the pressure is about 8.3 torr, the purging process is repeated for three times, and then the smelting process is performed 102; and (3) The smelting current is 550 ampere, after the conclusion of smelting and being cooled off completely, the alloy block is turned upside down before being smelted again with this repeating for more than or equal to 5 times for ensuring all the elements in the specimen are uniformly mixed. Thereafter, the alloy block may be cooled completely before the smelting arc is de-vacuumed and the ingot is obtained as a molded specimen 103.

According to the first embodiment of the disclosure, the composite is one principal strengthening phase compound and one cemented phase of principal refractory metal, and the principal strengthening phase compound can be borides. In the same embodiment, the mole fractions of the principal strengthening phase compound and the mole fraction of the cemented phase of principal refractory metal are different. The composition is described as the followings:

(1) The cemented phase of principal refractory metal is selected from niobium, tantalum, molybdenum and tungsten; and (2) The boride of the cemented phase of principal refractory metal is selected from $TiB_2$ and $ZrB_2$.

According to FIG. 2A, the boride to be used may be $TiB_2$ (TB) and $ZrB_2$ (Z2) and the principal refractory metal to be used may be niobium (Nb), tantalum (Ta), molybdenum (Mo) and tungsten (W). According to the figure, it is the composite combined by a unitary boride (the principal strengthening phase compound) and a unitary principal refractory metal (the cemented phase of principal refractory metal), and the mole fractions of the boride and the refractory metal are different.

Further, FIG. 2B is related to the hardness (HV) and the toughness ($K_{IC}$) of the composite composed of the unitary boride (the principal strengthening phase compound) and the unitary principal refractory metal (the cemented phase of principal refractory metal).

According to the embodiment of the disclosure, the composite is two principal strengthening phase compounds and one cemented phase of principal refractory metal, and the principal strengthening phase compound can be a mixture of a boride and one or more than one carbides. Plus, the mole fractions of the principal strengthening phase compound and the mole fraction of the cemented phase of principal refractory metal are different. The principal strengthening phase compound includes at least two different compounds in non-equal molar ratio, and the composition is described as the followings:

(1) The cemented phase of principal refractory metal is selected from niobium, tantalum, molybdenum and tungsten;

(2) The boride of the cemented phase of principal refractory metal is selected from $TiB_2$ and $ZrB_2$; and (3) The carbide of the strengthening phase compound is selected from TiC, VC, ZrC, HfC, WC, NbC and TaC.

According to FIG. 3A, the carbide to be used may be NbC (N) and TaC (T) and the principal refractory metal to be used may be tungsten (W). According to the figure, it is the composite combined by a binary carbide with non-equal molar ratio (the principal strengthening phase compound) and a unitary principal refractory metal (the cemented phase of principal refractory metal), and the principal strengthening phase compound includes at least two different carbides in non-equal molar ratio.

Further, FIG. 3B is related to the hardness (HV) and the toughness ($K_{IC}$) of the composite composed of the binary carbide (the principal strengthening phase compound) and the unitary principal refractory metal (the cemented phase of principal refractory metal).

According to FIG. 4A, the carbide to be used may be TiC, VC, WC, NbC and TaC and the principal refractory metal to be used may be tungsten (W). According to the figure, it is the composite combined by a trinary compound (the principal strengthening phase compound) and a unitary principal refractory metal (the cemented phase of principal refractory metal), and the principal strengthening phase compound includes at least two different carbides in non-equal molar ratio.

Further, FIG. 4B is related to the hardness (HV) and the toughness ($K_{IC}$) of the composite composed of the trinary (or more) carbide (the principal strengthening phase compound) and the unitary principal refractory metal (the cemented phase of principal refractory metal).

According to FIG. 5A, the carbide to be used may be TiC and TaC and the principal refractory metal to be used may be $TiB_2$ and $ZrB_2$ According to the figure, it is the composite combined by a trinary compound (the principal strengthening phase compound) and a unitary principal refractory metal (the cemented phase of principal refractory metal), wherein the trinary compound includes two carbides and one boride, and the principal strengthening phase compound includes at least two different compounds in non-equal molar ratio.

Further, FIG. 5B is related to the hardness (HV) and the toughness ($K_{IC}$) of the composite composed of the trinary (or more) carbide (the principal strengthening phase compound) and the unitary principal refractory metal (the cemented phase of principal refractory metal).

According to the disclosure, as compared to traditional technologies, the composite of the disclosure has the following advantages:

1. The disclosed composite can appropriately combine at least one principal strengthening phase compound and one cemented phase of principal refractory metal, both of which may be smelted in non-equal molar ratio so that the resulting composite could be associated with a high hardness and a high toughness.

2. As compared to traditional cement composites, the composite of the disclosure has a high hardness and a high toughness, with the strengthening phase compound and the cemented phase of principal refractory metal being prepared in non-equal molar ratio during the corresponding preparation process.

3. As compared to traditional cement composites, the composite of the disclosure has a high hardness and a high toughness, with any two compounds in the strengthening phase compound being prepared in non-equal molar ratio during the preparation process.

Note that the specifications relating to the above embodiments should be construed as exemplary rather than as limitative of the present disclosure. The equivalent variations and modifications on the structures or the process by reference to the specification and the drawings of the disclosure, or application to the other relevant technology fields directly or indirectly should be construed similarly as falling within the protection scope of the disclosure.

What is claimed is:

1. A composite, consisting of a first principal strengthening phase compound, a second principal strengthening phase compound, and a third principal strengthening phase compound and one cementing phase of principal refractory metal, wherein the first principal strengthening phase compound is selected from the group consisting of $TiB_2$ and $ZrB_2$, the second principal strengthening phase compound and the third principal strengthening phase compound are selected individually and independently from the group consisting of TiC, VC, ZrC, HfC, WC, NbC, and TaC, the cementing phase of principal refractory metal is selected from the group consisting of niobium, tantalum, molybdenum and tungsten, the mole fraction of a total of the first principal strengthening phase compound, the second principal strengthening phase compound, and the third principal strengthening phase compound is 60 mol %, and the mole fraction of the principal cementing refractory metal is 40 mol %, and the first principal strengthening phase compound, the second principal strengthening phase compound, and the third principal strengthening phase compound and the cementing phase of principal refractory metal are uniformly mixed by a smelting process in a water-cooled copper mold.

* * * * *